United States Patent [19]

Barnett et al.

[11] 4,110,521

[45] Aug. 29, 1978

[54] CONTINUOUS POLYMERIZATION APPARATUS AND PROCESS

[75] Inventors: Richard Earl Barnett, Pittsburgh, Pa.; Guy Thomas Woodrum, Blacksburg, Va.

[73] Assignee: Calgon Corporation, Pittsburgh, Pa.

[21] Appl. No.: 835,091

[22] Filed: Sep. 21, 1977

[51] Int. Cl.² .............................................. C08F 2/10
[52] U.S. Cl. .................................. 526/64; 23/288 K; 23/288 R; 526/86; 526/88; 526/295; 526/303; 526/918
[58] Field of Search .............. 526/64, 86, 88, 295, 526/303, 918; 23/288 R, 288 K

[56] References Cited

U.S. PATENT DOCUMENTS

| 2,820,777 | 1/1953 | Suen et al. | 260/89.7 |
| 3,405,106 | 10/1968 | Scanley | 526/303 |
| 3,732,193 | 5/1973 | Svarz | 260/79.3 MU |
| 3,923,756 | 12/1975 | Svarz | 526/918 |
| 3,957,739 | 5/1976 | Cabestany et al. | 526/303 |
| 4,032,701 | 6/1977 | Hughes | 526/88 |

OTHER PUBLICATIONS

"Motionless Mixers Move Into New Processing Roles," Chemical Engineering, May 9, 1977, pp. 95–96.
"Static Mixer Modules," Design Bulletin, Kenics Corp., 1976.

Primary Examiner—Alan Holler
Attorney, Agent, or Firm—Rudolph J. Anderson, Jr.; Mario A. Monaco; Martin L. Katz

[57] ABSTRACT

An apparatus and process for the production of polymers which utilizes a tubular reactor which contains static mixers.

7 Claims, 1 Drawing Figure

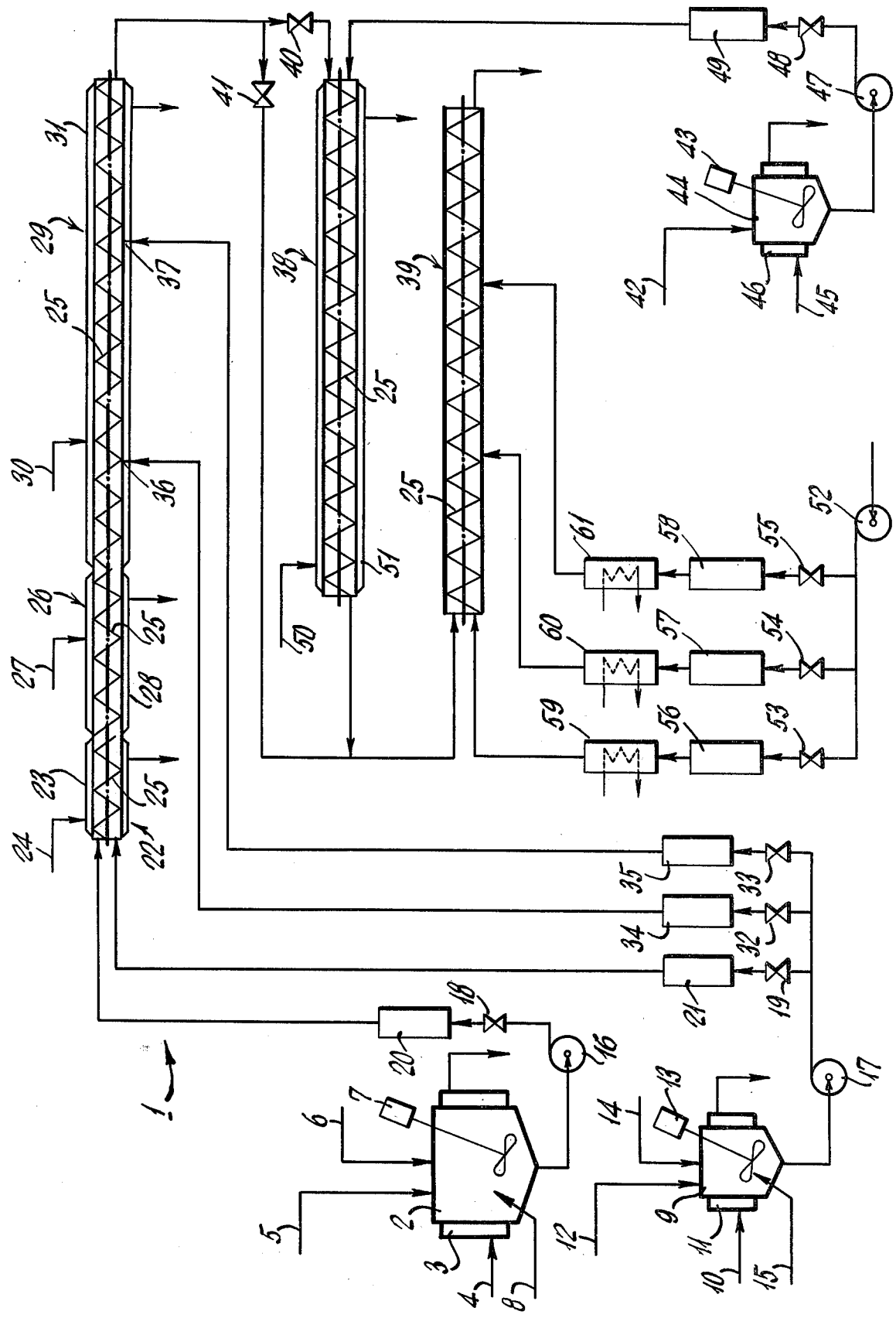

CONTINUOUS POLYMERIZATION APPARATUS AND PROCESS

This invention relates to an apparatus and process for the continuous polymerization of water soluble polymers.

More particularly, this invention relates to an apparatus and process for the continuous polymerization of water soluble polymers which utilizes a tubular reactor which contains static mixers.

Water soluble polymers have been polymerized in aqueous solutions under appropriate conditions. Normally, the polymerization is carried out by a batch-type process which produces a polymer solution at low concentrations. Because of the viscosity encountered in the polymerization of these water soluble polymers, it is difficult to conduct the polymerization at high concentrations and still maintain control over the reaction. Heat transfer in these batch reactors is particularly poor, resulting in adiabatic reactions. In the absence of heat transfer, and at high monomer concentrations, the reaction proceeds to elevated temperature conditions in the adiabatic process. These elevated temperature conditions during the polymerization adversely affect both molecular weight and molecular weight distribution.

In view of the above-mentioned drawbacks of batch-type polymerization processes, several other polymerization processes have been proposed. For example, U.S. Pat. No. 2,820,777 discloses a continuous process for the polymerization and hydrolysis of acrylamide. This patent does not, however, disclose any suitable types of apparatus or process parameters for carrying out the disclosed process. U.S. Pat. No. 3,732,193 discloses a continuous polymerization process in which the aqueous solution of a water soluble unsaturated monomer is polymerized on a heated, continuously moving belt to produce polymeric products in a dry, thin film form.

It is an object of this invention to provide an apparatus and process for the continuous polymerization of water soluble polymers.

It is another object of this invention to provide an apparatus and process for the continuous polymerization of water soluble polymers in a concentrated form.

It is a further object of this invention to provide an apparatus and process for the continuous polymerization of water soluble polymers under isothermal conditions.

It is still a further object of this invention to provide an apparatus and process for the continuous polymerization of water soluble polymers in which the reaction conditions are controlled in order to produce polymers of uniform molecular weight and molecular weight distributions.

These and other objects of this invention are accomplished by the continuous reactor which comprises a jacketed, tubular reactor which contains static mixers for (1) the thorough mixing of a polymerization catalyst and the monomer solution being polymerized; (2) conducting effective heat transfer; (3) the postreaction of the resultant polymer, if desired; and (4) dilution of the polymer solution for direct usage, if desired.

The process of this invention generally comprises feeding monomer and initiator to a jacketed, static mixer where the streams are efficiently mixed at low temperature to assure a uniform initiator distribution. The monomer-initiator mixture is then heated to the operating temperature where the polymerization is conducted under isothermal conditions using jacketed, static mixers to provide heat transfer.

Some of the important factors involved in the polymerization process include the heat of polymerization, the operating temperature, residence time, monomer concentration, initiator concentration and the removal of oxygen from the reactant solutions and apparatus.

In accordance with this invention, all known water soluble, unsaturated monomers can be polymerized by the continuous static reactor process. Such monomers include, but are not restricted to, acrylamide, acrylic acid, dimethyldiallyl ammonium chloride, etc., or any mixtures thereof. Aqueous solutions of the monomers to be polymerized can be varied widely in monomer content. Generally, between 5 and 75% by weight aqueous solutions of monomers are used, depending upon the monomer and system involved.

Free radical yielding initiators are preferentially used in the polymerization process. Both organic and inorganic type compounds are acceptable for use in this invention. Organic peroxy type compounds are used preferentially in the polymerizations. The most preferred being tertiary butyl peroxy pivalate in amounts between 0.003 and 3.0% by weight of monomer. Initiators like ammonium persulfate are used as well as redox systems, the most preferred being ammonium persulfate and sodium metabisulfite. Generally, the amounts of these free radical initiators range between 0.001 and 5.0% by weight of monomer.

Depending upon the monomer system being used, the polymerization is conducted isothermally between 25° and 100° C. with the temperature being controlled by jacketed reactors. Oxygen may be removed from the system by purging with nitrogen or any other conventional means. Also, depending upon the monomer system being used and the degree of conversion desired, the residence time can be varied from between 15 minutes and 8 hours. In addition to conducting polymerization, it is also practical to conduct post reactions and/or dilution using this equipment.

The apparatus of the instant invention will be more specifically understood upon reference to the accompanying drawing wherein:

FIG. 1 is a schematic view of the continuous polymerization system of this invention.

The continuous polymerization system 1 comprises a tank 2 which has a jacket 3 into which a heated or cooled fluid 4 is cycled to control the temperature of the tank. A monomer solution 5 and a pH control substance 6 such as acid or caustic is fed to the tank and agitated by a mixer 7. The contents of the tank may be purged with nitrogen 8 to remove dissolved oxygen from the monomer solution. A second tank 9 is used to prepare an initiator solution. A heated or cooled fluid 10 is circulated through a jacket 11 which surrounds the tank 9. Initiator solution 12 is agitated by mixer 13 with acid or caustic 14 to adjust its pH and purged with nitrogen 15 to remove dissolved oxygen from the initiator solution. The monomer solution and the initiator solution are then pumped by pumps 16 and 17 at a controlled rate by means of valves 18 and 19 and rotometers 20 and 21 to the premixer 22. The premixer 22 is tubular and has a jacket 23 through which a heated or cooled fluid 24 is pumped to control the temperature of the monomer solution and initiator. The premixer 22 contains a static mixer 25 which thoroughly mixes the monomer and initiator solutions before they flow to the tubular preheater 26 where the temperature is adjusted to operational conditions by fluid 27 which flows through jacket 28 which surrounds the preheater 26. Preheater 26 contains a static mixer 25 which provides mixing for heat transfer. Polymerization is conducted in the tubular polymerizer 29 where temperature may be controlled by fluid 30 which flows through jacket 31. Again, the polymerizer 29 contains a static mixer 25 which serves a dual function. Static mixers are used to provide mixing for heat transfer and sequential initiator addition. If it is desired to incrementally add the initiator solution from tank 9 to the reaction mixture, valves 32 and 33 and rotometers 34 and 35 may be used to control the rate of feed to the polymerizer at points 36 and 37 in the polymerizer 29.

At the end of the polymerization, the polymer gel can be fed to isolating equipment (not shown) such as a dryer or precipitator to remove the water content of the polymer or to a post reactor 38 or a diluter 39. The feed to the post reactor 38 or diluter 39 is controlled with diverter valves 40 and 41.

The post reactor 38 is tubular and has a jacket 51 through which a heated or cooled fluid 50 is pumped to control the temperature of the polymer solution. The post reaction 38 contains a static mixer 25 which is used to provide mixing of the polymer and reactant solutions and to also provide mixing for heat transfer.

The diluter 39 is tubular and contains static mixers 25 which thoroughly mix the polymer and water feeds.

If desired, the polymer exiting the post reactor 38 may be fed directly to isolation equipment (not shown) for removal of water, without going through the diluter 39.

Reactants to be added to the post reactor 38 are prepared in a third tank 44 equipped with a jacket 46. A mixer 43 and heat transfer fluid 45 are provided if required. The reactants are fed from tank 44 to the post reactor 38 using pump 47, the rate of which is controlled by valve 48 and measured on rotometer 49.

The dilution water is pumped by pump 52 to the diluter 39 at a controlled rate by means of valve 53 and rotometer 56. The temperature of the dilution water can be adjusted using heat exchanger 59. If it is desired to incrementally add the dilution water to the diluter 39, this can be accomplished at controlled rates using valves 54 and 55 and rotometers 57 and 58. The temperature of the incremental dilution water can also be adjusted using heat exchanger 60 and 61.

The product from the diluter 39 can go to bulk storage or may be directly used.

For the purpose of the examples described below, all experiments were performed in continuous equipment as described in the drawing. Specific equipment conditions and process conditions will be given for each example.

EXAMPLE I

| Preparation of Polyacrylamide | |
|---|---|
| Process Specifications: | |
| Premixer (23) | 1" diameter jacketed pipe, 7" long, containing 1" diameter × 1" long Ross ISG static mixers |
| Preheater (26) | 1" diameter jacketed pipe, 7" long, containing 1" diameter × 1" long Ross ISG static mixers |
| Polymerizer (29) | 1" diameter jacketed pipe, 24' long, containing 1" diameter × 1" long Koch CY static mixers |

| Preparation of Polyacrylamide | |
|---|---|
| Premixer Jacket Temperature | 25° C. |
| Preheater Jacket Temperature | 55° C. |
| Polymerizer Jacket Temperature | 55° C. |
| Monomer Solution Feed Rate | 15 ml/min |
| Initiator Solution Feed Rate | 0.76 ml/min |
| Starting Materials: | |
| Monomer Solution- | |
| 50 percent acrylamide solution | 8.63 pounds |
| Deionized water | 26.37 pounds |
| Initiator Solution- | |
| t-butyl peroxy pivalate | 0.037 pounds |
| Pentasodium diethylenetriamine pentaacetic acid | 0.075 pounds |
| Deionized water | 3.192 pounds |

Monomer and initiator solutions, their composition as indicated above, are made up in separate tanks. The pH of the solutions are adjusted to 6.5. The temperatures of the solutions are adjusted to 25° C. and the solutions are purged with $N_2$ gas to remove dissolved oxygen to less than 0.2 ppm. Meanwhile, the tubular reactor (Premixer, Preheater and Polymerizer) and all piping are inerted with $N_2$ gas to remove oxygen. Flow of monomer and initiator solutions is begun simultaneously to the premixer. After about 4 hours, polymer gel began exiting the polymerizer. The process was continued for approximately 120 hours. During this period, conversion of the polymer exiting the polymerizer was 95-99%. Temperature probes positioned in the polymerizer indicated that the polymer temperature varied from 53°-57° C. A sample of polymer gel was taken from the exit of the polymerizer. It was found that this material had an intrinsic viscosity of 15 dl/g when measured in 1N $NaNO_3$ at 25° C. Normally, polymer made via a batch, adiabatic process has a comparable intrinsic viscosity of about 9 dl/g.

EXAMPLE II

| Preparation of Hydrolyzed Polyacrylamide | |
|---|---|
| Process Specifications: | |
| Post Reactor (38) | 1" diameter jacketed pipe, 36" long, containing 1" diameter × 1" long Koch CY static mixers |
| Post Reactor Jacket Temperature | 65° C. |
| Polymer Solution Feed Rate | 15.76 ml/min |
| Caustic Solution Feed Rate | 0.54 ml/min |
| Starting Materials: | |
| Polymer Solution | 38.30 pounds |
| Caustic Solution (50% NaOH) | 1.82 pounds |

Polymer gel from Example I was fed directly from the polymerizer to the post reactor. After about ½ hour, polymer gel began exiting the post reactor. When the temperature was equilibrated at 64° C. in the post reactor, feed of caustic solution was begun. The process was continued for approximately 12 hours. During this period, hydrolysis values were determined on the polymer exiting the post reactor. The range of percent hydrolysis was 41.9-43.3.

EXAMPLE III

| Preparation of Dilute Hydrolyzed Polyacrylamide | |
|---|---|
| Process Specifications: | |
| Diluter (39) - Section #1 | 1" diameter pipe, 24" long, containing 6" of 1" diameter × 1" long Ross ISG static mixers and 18" of 1" diameter Ross LPD static mixer |
| - Section #2 | 1" diameter pipe, 24" long, |

| Preparation of Dilute Hydrolyzed Polyacrylamide | |
| --- | --- |
| | containing 6" of 1" diameter × 1" long Ross ISG static mixers and 18" of 1" diameter Ross LPD static mixer |
| Polymer Solution Feed Rate | 16.3 ml/min |
| Water Feed Rate | 44.7 ml/min |
| Starting Materials: | |
| Hydrolyzed Polymer Solution | 40.12 pounds |
| Water (Section #1) | 55.0 pounds |
| Water (Section #2) | 55.0 pounds |

Hydrolyzed polymer gel from Example II was fed directly from the post reactor to the diluter where water adjusted to 65° C. was being added to Section #1 of a two-stage tubular dilution device. After about 15 minutes, a diluted polymer gel (about 6% solids) began exiting the diluter. The process was continued for about 1 hour, whence water, adjusted to 65° C., was fed into Section #2 of the dilution device. In about 12 minutes a noticeable change occurred, and less viscous polymer solution began exiting the diluter. The process was continued for about 4 hours, resulting in a uniform polymer solution with a concentration of 3.3% solids.

EXAMPLE IV

| Preparation of Polydimethyldiallyl Ammonium Chloride | |
| --- | --- |
| Process Specifications: | |
| Premixer (23) | 1" diameter jacketed pipe, 7" long, containing 1" diameter × 1" long Ross ISG static mixers |
| Preheater (26) | 1" diameter jacketed pipe, 7" long, containing 1" diameter × 1" long Ross ISG static mixers |
| Polymerizer (29) | 1" diameter jacketed pipe, 24' long, containing 1" diameter Ross LPD static mixer |
| Diluter (39) | 1" diameter pipe, 36" long, containing 1" diameter × 1" long Koch CY static mixers |
| Premixer Jacket Temperature | 25° C. |
| Preheater Jacket Temperature | 80° C. |
| Polymerizer Jacket Temperature | 80° C. |
| Monomer Solution Feed Rate | 31.5 ml/min |
| Initiator Solution Feed Rate- | |
| (Port #1) | 0.2 ml/min |
| (Port #2) | 0.2 ml/min |
| (Port #3) | 1.8 ml/min |
| Dilution Water Feed Rate | 105 ml/min |
| Starting Materials: | |
| Monomer Solution- | |
| 68.5% dimethyldiallyl ammonium chloride | 33.22 pounds |
| Tetrasodium ethylenediamine tetraacetic acid | 0.02 pounds |
| Distilled water | 1.78 pounds |
| Initiator Solution- | |
| Ammonium persulfate | 0.34 pounds |
| Distilled water | 2.11 pounds |
| Dilution Water | 116.64 pounds |

Monomer and initiator solutions, their composition as indicated above, are made up in separate tanks. The pH of the solutions are adjusted to 6.5. The temperature of the solutions is adjusted to 25° C. and the solutions are purged with $N_2$ gas to remove dissolved oxygen to less than 0.2 ppm. Meanwhile, the tubular reactor (Premixer, Preheater and Polymerizer) and all piping are inerted with $N_2$ gas to remove oxygen. Flow of monomer and initiator (Port #1) is begun simultaneously to the premixer. After about 1 hour the flow of initiator is begun to Port #2. Approximately ½ hour later, flow of initiator is begun to Port #3. Port #2 is located near the center of the polymerizer while Port #3 is approximately 18 feet from the entrance to the polymerizer.

After about 2 hours, polymer gel began exiting the polymerizer. The process was continued for approximately 18 hours. During this period, conversion of the polymer exiting the polymerizer was 93–99%, while polymer solids varied from 59–62%. The polymer gel was then directed to the diluter where the polymer and water were simultaneously added at the front of the diluter. In about 15 minutes, diluted polymer began exiting the diluter. The process was continued for about 11 hours, during which time the solids content varied from 16.6–16.9%.

We claim:

1. A device for the production of water soluble polymers which comprises a tubular premixer which is surrounded by a jacket in which a heated or cooled fluid is circulated to control the temperature of fluids being passed through the premixer, means to feed a monomer solution to the premixer, means to feed an initiator solution to the premixer, static mixers disposed inside the tubular premixer to provide thorough mixing of the monomer solution and the initiator solution, a tubular preheater into which the monomer-initiator mixture is passed said tubular preheater being surrounded by a jacket in which a heated fluid is circulated to increase the temperature of the monomer-initiator mixture, static mixers disposed inside the tubular preheater to provide mixing for uniform heat transfer to the monomer-initiator mixture, a tubular polymerizer which contains static mixers and a jacket which surrounds the tubular polymerizer through which fluid is pumped to control the temperature of the monomer-initiator mixture being polymerized, and means to dispense the polymer solution from the tubular polymerizer.

2. A device as in claim 1 wherein the initiator solution is also added to the polymerizer at one or more points throughout the length of the polymerizer.

3. A device as in claim 1 which further comprises a tubular reactor which contains static mixers for the mixing and reaction of the polymer solution with chemical reactants to chemically modify the polymer solution.

4. A device as in claim 1 which further comprises a diluter which consists essentially of a hollow tube containing static mixers and means to add dilution water to the polymer solution at one or more points.

5. A process for the production of water soluble polymers which comprises adding a monomer solution and an initiator solution to a tubular premixer which contains static mixers to homogeneously disperse the initiator solution in the monomer solution, heating the monomer-initiator mixture in a tubular preheater which contains static mixers to provide effective heat transfer throughout the entire cross section of the tubular preheater and polymerizing the monomer-initiator mixture in a tubular reactor which contains static mixers to provide mixing for heat transfer.

6. A process as in claim 5 which further comprises the steps of passing the polymer solution through a tubular reactor which contains static mixers, adding to the polymer solution at least one chemical reactant and thoroughly mixing the polymer solution and the chemical reactants to produce a chemically modified polymer solution.

7. A process as in claim 5 which further comprises the step of homogeneously mixing the polymer solution and dilution water in a tubular mixer which contains static mixers.

* * * * *